United States Patent
Zhang

(10) Patent No.: US 10,487,290 B2
(45) Date of Patent: Nov. 26, 2019

(54) LIPID ACTIVATION WITH CUMIN

(71) Applicant: NESTEC S.A., Vevey (CH)

(72) Inventor: Jiyuan Zhang, Singapore (SG)

(73) Assignee: Societe des Produits Nestle S.A., Vevey (CH)

(*) Notice: Subject to any disclaimer, the term of this patent is extended or adjusted under 35 U.S.C. 154(b) by 294 days.

(21) Appl. No.: 15/516,112

(22) PCT Filed: Sep. 30, 2015

(86) PCT No.: PCT/EP2015/072554
§ 371 (c)(1),
(2) Date: Mar. 31, 2017

(87) PCT Pub. No.: WO2016/050843
PCT Pub. Date: Apr. 7, 2016

(65) Prior Publication Data
US 2017/0306263 A1    Oct. 26, 2017

(30) Foreign Application Priority Data
Oct. 2, 2014 (EP) .................................. 14187497

(51) Int. Cl.
| C11C 3/06 | (2006.01) |
| C11C 3/00 | (2006.01) |
| A23D 9/007 | (2006.01) |
| A23D 9/04 | (2006.01) |
| A23L 27/10 | (2016.01) |
| A23L 23/00 | (2016.01) |

(52) U.S. Cl.
CPC ............. *C11C 3/006* (2013.01); *A23D 9/007* (2013.01); *A23D 9/04* (2013.01); *A23L 23/00* (2016.08); *A23L 27/10* (2016.08)

(58) Field of Classification Search
CPC ............................ C11C 1/006; A23D 9/007; A23D 9/04; A23L 27/10; A23L 23/00
See application file for complete search history.

(56) References Cited

U.S. PATENT DOCUMENTS 3,664,851 A * 5/1972 Fenstra ................ A23D 7/0053
426/544
5,178,892 A * 1/1993 Simmons ................ C11C 3/006
426/533
(Continued)

FOREIGN PATENT DOCUMENTS

| JP | 2003102382 | 4/2003 |
| WO | 2011039155 | 4/2011 |
| WO | 2014077105 | 5/2014 |

OTHER PUBLICATIONS

Yanishlieva et al. "Natural antioxidants from herbs and spices" Eur. J. Lipid Sci. Technol., 2006, vol. 108, pp. 776-793, XP001245886.

*Primary Examiner* — Cephia D Toomer
(74) *Attorney, Agent, or Firm* — K&L Gates LLP

(57) ABSTRACT

The present invention relates to a method for accelerating oxidation of lipids comprising the step of holding a lipid composition in the presence of cumin for a prolonged time at an elevated temperature. Further aspects of the invention are the resulting lipid composition as well as food products such as concentrated seasoning or flavoring products, condiments, sauces, gravies or ready-to-eat food products comprising said lipid composition.

12 Claims, 3 Drawing Sheets

(56) References Cited

U.S. PATENT DOCUMENTS

| | | | |
|---|---|---|---|
| 2005/0175762 A1* | 8/2005 | Richards | A23B 4/20 |
| | | | 426/601 |
| 2014/0065284 A1* | 3/2014 | Arai | C11C 3/006 |
| | | | 426/607 |
| 2015/0230490 A1* | 8/2015 | Hanajiri | A23L 23/10 |
| | | | 426/607 |

* cited by examiner

LIPID ACTIVATION WITH CUMIN

CROSS REFERENCE TO RELATED APPLICATIONS

The present application is a National Stage of International Application No. PCT/EP2015/072554, filed on Sep. 30, 2015, which claims priority to European Patent Application No. 14187497.4, filed on Oct. 2, 2014, the entire contents of which are being incorporated herein by reference.

The present invention relates to a method for accelerating oxidation of a lipid composition. Further aspects of the invention are the resulting lipid composition as well as food products such as concentrated seasoning or flavoring products, condiments, sauces, gravies or ready-to-eat food products comprising said lipid composition.

Oxidation of lipids such as fats and oils is known to generate many natural flavour compounds such as hexanal, 2-octenal, 2-nonenal, 2,4-nonadienal, 2,4-decadienal, trans-4,5-epoxy-2-decanal etc. There is an interest in the food industry to make good use of those flavour compounds and to have them for example integrated into flavour reaction processes such as Maillard reactions, in order to enhance the generation of certain flavour notes, such as more meaty or fatty flavour notes. Lipid oxidation can be accelerated for example by thermally induced auto-oxidation, photo-oxidation, heavy metal catalysis, activated oxygen and enzymatic catalysis.

Healthy eating is presently one of the main trends worldwide, and the food industry has a growing interest in the development of new food and beverage products having less fat, but still excellent organoleptic properties. Oil and Fat are important providers and carriers of taste and aroma, and it is difficult to maintain a similar good taste and aroma profile of a food product having little oil and fat than a same product having lots of oil and fat. For example, fried flavour is often associated with fat and seriously compromised in low fat products. Often, a lack of fried flavour is therefore compensated for by longer frying times of the oil product and at higher temperatures. However, such longer and higher temperature treatments of oils and fats may generate undesired, potentially carcinogenic by-products, which are not desired. Furthermore, the stability and shelf life of such highly degraded lipid products is reduced.

It is known in the art that certain metal ions such as Co, Cu, Fe, Mn or Ni ions can work as catalysts for accelerating oxidation reactions of fats and oils. Evidence for this is for example provided by Belitz H. D. et al. in Food Chemistry, third revised Edition, pages 198-200. However, today's consumers prefer food products that are made entirely with natural and authentic ingredients. An addition of chemicals such as metal salts into a e.g. food seasoning products is much less appreciated by consumers.

Spices are known and used since ancient civilizations for their distinguished culinary and medical properties. It is for example common practice in Asia to incorporate spices and herbs in the cooking process, especially also with the combination of oil, for example for the preparation of chili oil in Sichuan, curry in India and tom yam in Thailand. However, the main purpose of these cooking processes is to extract flavours and/or essential oils from those spices and herbs into the oil or fat phase of a food preparation.

Hence, there is still a persisting need in the food industry to find new and better solutions to reduce the fat and/or oil content of a food product and this without compromising or reducing the natural taste and flavour provided for by that fat and/or oil.

Consequently, there is also a persisting need of enhancing the natural flavour, e.g. the fried flavour, of a fat or oil composition through oxidation of the oil or fat in a more efficient way, at lower temperatures and therefore more cost effective, and for shorter reaction times. Such fat or oil compositions can then be used in food products to reduce the amount of fat or oil without reducing the organoleptic flavour impact.

The object of the present invention is to improve the state of the art and to provide an improved solution to overcome at least some of the inconveniences described above. Particularly, the object of the present invention is to provide a new process for lipid oxidation which is industrially feasible and more cost effective than known processes in the art, and where the process relies on all natural and authentic ingredients.

The object of the present invention is achieved by the subject matter of the independent claims. The dependent claims further develop the idea of the present invention.

Accordingly, the present invention provides in a first aspect a method for accelerating oxidation of lipids comprising the step of holding a lipid composition in the presence of cumin for a time period from 30 minutes to 6 hours at a temperature from 80° C. to 180° C.

In a second aspect, the invention relates to a lipid composition obtainable by the method of the present invention.

A third aspect of the invention relates to a method for improving the flavor of a food composition comprising the step of adding the lipid composition of the present invention to said food composition, and then optionally further processing said food composition in a flavor reaction process, such as for example a Maillard reaction process, to result in a flavor reaction product.

A still further aspect is a food product comprising the lipid composition of the present invention or a flavor reaction product made with using the lipid composition of the present invention.

The inventor has evaluated the use of iron provided in the form as a chemical salt and in the form of different natural sources as an ingredient for a use in the process of fat and oil oxidation. Thereby, he has first observed that iron when provided in free chemical form as a salt accelerates the oxidation of oil and fat. In a second step, the inventor has then tested the catalytic activity of different herbs and spices which were provided to the fat and/or oil compositions in amounts equimolar as to their natural content of iron. Thereby, the inventor surprisingly found that cumin had a superior and strong catalytic oxidation effect upon hydrolyzed fat, non-hydrolyzed fat and oil, when compared to free iron and other herbs and spices. The use of cumin as a natural catalyst in oxidative reactions with compositions comprising fats and/or oils therefore allows significantly reducing the reaction time and lowering the reaction temperature to achieve good oxidation results. Details of the results are provided herein in the Example section below.

Therefore, oxidation of oil and fat can now be accelerated significantly in a simple and natural authentic way by adding cumin e.g. in the form of a food grade powder, to an activating heat treatment reaction with oils and/or fats. Thereby, on one hand the speed of the oxidation reaction are accelerated and on a second hand flavor and taste compounds and precursors thereof are produced more readily and more efficiently. Hence, the present invention is able to reduce the temperature and time used for a thermal activation of oils and fat compositions. It also resolves in more intense and new flavor rich activated fat compositions as the inventive process results: i) in a much lesser loss of volatile low-molecular weight flavor compounds from the reaction composition during the thermal processing, and consequently a more flavor rich activated oil-fat composition; and ii) in a reduction of processing costs due to less costs of energy for the heating reaction and saving of time due to the shorter processing reaction. Furthermore, the use of cumin spice is very natural and does not be declared as a chemical compound and will be well accepted by consumers.

Furthermore, the activated lipid composition is also richer in natural precursors of still further flavor compounds which can for example be activated by making use of such activated lipid composition as ingredient in still further process flavor reactions.

DETAILED DESCRIPTION OF THE INVENTION

Figure 1:
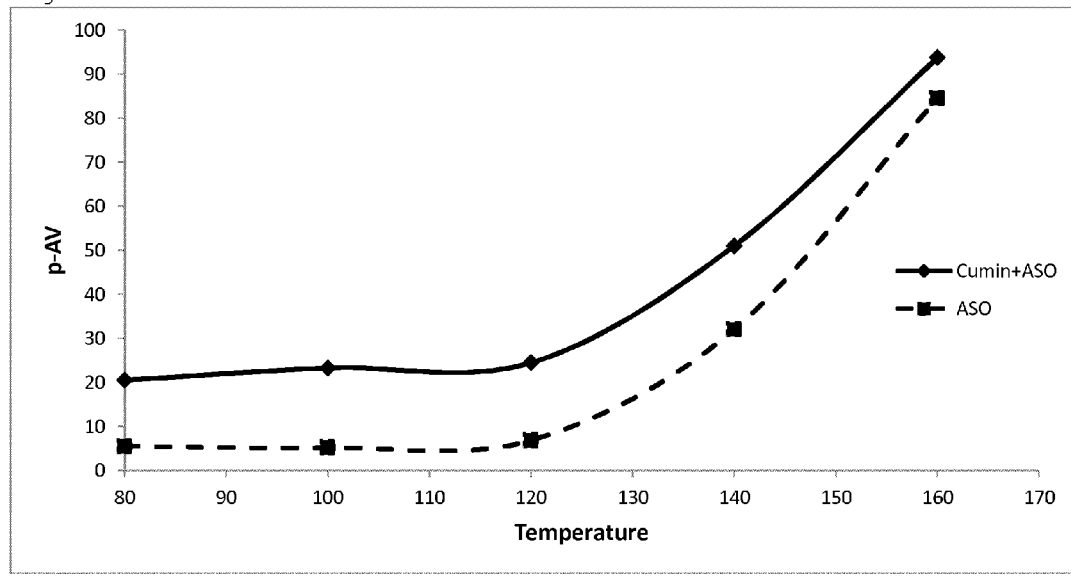
FIG. 1: Plotted p-AV values of activated sunflower oil obtained with or without cumin at 3.2 wt % at different temperatures. "ASO" means activated sunflower oil.

The present invention pertains to a method for accelerating oxidation of lipids comprising the step of holding a lipid composition in the presence of cumin for a time period from 30 minutes to 6 hours at a temperature from 80° C. to 180° C.

The terms "lipid" or "lipids" are defined herein as a group of naturally occurring hydrophobic molecules including fatty acids, fats, oils, waxes, sterols and fat-soluble vitamins. Particularly, the terms refer herein to eatable fats and eatable oils, and a combination thereof.

"Fat" is herein defined as a triglyceride which is solid at normal room temperature; and "oil" is defined as a triglyceride which is liquid at normal room temperature.

The term "cumin" refers herein to plant material, the plant belonging to the species *Cuminum cyminum*.

A "lipid composition" is a composition comprising lipids. Preferably, the lipid composition comprises at least 75 wt % fat, oil or a combination thereof. More preferably, the lipid composition comprises at least 85 wt % fat, oil or a combination thereof.

In a preferred embodiment of the present invention, the cumin is present in the lipid composition in an amount of 0.1 to 15 wt % or 20 wt %, preferably however in an amount of 0.5 to 10 wt %, more preferably in an amount of 3 to 7 wt %. The optimal catalytic efficiency, i.e. between costs of adding cumin and oxidative yield, is between 3 and 7 wt % as exemplified below.

Preferably, the temperature range of the present method is from 120° C. to 160° C.

Preferably, the time period according to the present invention of holding the lipid composition in the presence of cumin at a temperature of at least 80° C. is at least 1 hour, preferably at least 1.5 hours, more preferably at least 2 hours. The shorter the time period, the less volatile compounds are lost during the heating step and the less the process costs money.

In one embodiment of the present invention, the lipid is a fat, and the fat is an animal fat, preferably a non-milk animal fat. Preferably, the fat is selected from beef fat, chicken fat, lamb fat or pork fat.

In another embodiment of the present invention, the lipid is an oil. Preferably, the oil is from plant origin, and preferably selected from the group consisting of corn oil, olive oil, soybean oil, sunflower oil, peanut oil, walnut oil, palm oil, rattan pepper oil, rapeseed oil, and sesame oil, or a combination thereof. Those oils are advantageously used in the present invention for the preparation of culinary food products where they provide an enhanced organoleptic experience of fried and fatty flavors. Most preferably, the oil is sunflower oil. Frying typically leads to the formation of (E,E)-2,4-decadienal which is one of the key compound contributing to fried aroma. And (E,E)-2,4-decadienal is typically formed via lipid oxidation of linoleic fatty acid, which is the dominant fatty acid in sunflower oil.

In one embodiment, the method of the present invention comprises a step of hydrolyzing the lipid composition. Preferably, the lipid composition is hydrolyzed before the step of holding said composition at a temperature from 80° C. to 180° C. The hydrolysis of the fat and/or oil before the oxidation step at a higher temperature has the advantage that the triglycerides and long fatty acid chains are at least partially degraded and provide a better source and access to the following oxidation reaction with cumin as a catalyst.

Preferably, the hydrolysis of the lipid composition is an enzymatic hydrolysis, preferably with making use of a lipase enzyme. Thereby, the enzymatic hydrolysis may be at a temperature from 40° C. to 60° C., preferably from 45° C. to 55° C. The advantage of using enzymatic hydrolysis over e.g. chemical or other physical hydrolysis methods is that a substantially complete hydrolysis of the fat material can be obtained and this without the use of any harsh chemicals or other dangerous interventions. Furthermore, the hydrolysis reaction can be kept at relatively low temperatures to minimize the loss of any volatile low molecular weight flavor compounds present in the reaction and limiting the costs of heating such reaction volumes. The lipase enzyme for this enzymatic hydrolysis step may be for example Lipase S or Lipozyme TL from Novozymes, Validase lipase AN or Validase lipase MJ from DSM. The enzymes are typically added to the hydrolysis reaction in an amount from 100 to 1500 mg per 100 g of fat.

In a preferred embodiment of the present invention, the cumin is a powdered or paste form of dried seeds from *Cuminum cyminum*. This is the most industrially practical and cost effective way.

Another aspect of the present invention relates to a lipid composition obtainable by the method as described above.

A still further aspect of the present invention pertains to a method for improving the flavor of a food composition comprising the step of adding the lipid composition of the present invention to said food composition. Preferably, the food composition comprising the added lipid composition is further processed in a flavor reaction process, preferably in a Maillard reaction process, to result in a flavor reaction product.

The present invention also pertains to a food product comprising the lipid composition or the flavor reaction product of the present invention as described above. The food product can be a concentrated seasoning or flavoring product, a condiment, a sauce, a gravy or a ready-to-eat food product.

Those skilled in the art will understand that they can freely combine all features of the present invention disclosed herein. In particular, features described for the method for accelerating oxidation of lipids of the present invention can be combined with the method for improving the flavor of a food composition and with the product claims of a lipid composition and the food product of the present invention; and vice versa. Further, features described for different embodiments of the present invention may be combined.

Further advantages and features of the present invention are apparent from the figures and following examples.

Example 1

Measuring Mineral Profile of Spices: Method and Results

Mineral content of 10 commercially available dried powdered spices purchased in Singapore and typically used in the preparation of curry and masala dishes were measured by Inductively Coupled Plasma-Atomic Emission Spectroscopy (ICP-AES). The mineral content determined included Fe, Cu, Ca, Mg, Mn, and Zn. The result of the identified mineral profiles is shown in Table I.

TABLE I

Mineral profile of selected spices is as follows:

| Mineral (mg/100 g) | Fe | Cu | Mg | Ca | Zn | Mn |
|---|---|---|---|---|---|---|
| 1 Thyme | 56.65 | 0.69 | 190.19 | 972.0 | 2.77 | 6.96 |
| 2 Turmeric | 31.58 | 0.53 | 300.20 | 185.7 | 1.79 | 5.70 |
| 3 Cardamon | 27.64 | 2.25 | 334.20 | 536.9 | 4.88 | 40.97 |
| 4 Clove | 25.27 | 0.67 | 321.20 | 802.1 | 1.37 | 53.04 |
| 5 Cumin | 15.44 | 1.00 | 359.00 | 897.1 | 4.17 | 3.85 |
| 6 Chilli | 12.86 | 1.04 | 220.90 | 201.3 | 1.87 | 1.86 |
| 7 Garlic | 10.39 | 0.29 | 76.67 | 68.8 | 1.75 | 1.08 |
| 8 Aniseed | 8.91 | 0.95 | 219.20 | 803.7 | 4.49 | 2.99 |
| 9 Fenugreek | 8.70 | 1.21 | 131.30 | 165.0 | 3.81 | 1408.00 |
| 10 White Pepper | 5.58 | 1.04 | 83.34 | 201.3 | 0.87 | 6.64 |

Example 2

Activation of Sunflower Oil with Spices: Method and Results

Oxidation of sunflower oil was carried out together with spice catalysts at 140° C. for 1 hour in a temperature controlled reaction vessel. The amount of powdered spice catalysts added to the oil was normalized at 5 ppm iron per trial, according to the amounts specified in Table II. Iron pyrophosphate, which is commonly used in fortification, was added as a control. Thereafter, the mixture, i.e. the activated oil composition, was cooled to room temperature.

For each catalyst used in the present example, the proper content of iron was determined according to standard technique and the result is shown in Table II.

TABLE II

Amounts of iron in selected spices and the corresponding weight percentages of the powders needed to reach 5 ppm Fe in the spice-oil system:

| Sample | Added catalyst | Fe (mg/100 g spice) | wt % |
|---|---|---|---|
| 1 | -none- | 0 | 0.0 |
| 2 | Cumin | 15.44 | 3.2 |
| 3 | Thyme | 56.65 | 0.9 |
| 4 | Turmeric | 31.58 | 1.6 |
| 5 | Fenugreek | 8.7 | 5.7 |
| 6 | Aniseed | 8.91 | 5.6 |
| 7 | Cardamon | 27.64 | 1.8 |
| 8 | Clove | 25.27 | 2.0 |
| 9 | Garlic | 10.39 | 4.8 |
| 10 | Chili | 12.86 | 3.9 |
| 11 | White pepper | 5.58 | 9.0 |
| 12 | Ferric Pyrophosphate | | 0.002 |

The degree of oxidation (p-AV) in the oil composition was then determined according to the official method provided by the International Organization for Standardization (ISO 6885:2006(E)), i.e. by measuring the presence of secondary oxidation products such as aldehydes and ketones by reacting them with p-Anisidine to form products that absorb at 350 nm wavelength of light. P-AV absorption values of the different mixtures were then determined, whereby the p-AV value is higher the more secondary oxidation products have been built in the lipid composition. A high p-AV value is indicative to the amount of secondary oxidation products present in the oil mixtures and hence the degree of oil activation. The results are indicated in Table III.

TABLE III

Results of oil activation are as follows:

| Sample | Added catalyst (5 ppm) | Reaction temperature | Reaction time | p-AV value |
|---|---|---|---|---|
| 1 | -none- | 140° C. | 1 hour | 32.10 |
| 2 | Cumin | 140° C. | 1 hour | 50.90 |
| 3 | Thyme | 140° C. | 1 hour | 39.84 |
| 4 | Turmeric | 140° C. | 1 hour | 39.50 |
| 5 | Fenugreek | 140° C. | 1 hour | 35.78 |
| 6 | Aniseed | 140° C. | 1 hour | 34.34 |
| 7 | Cardamon | 140° C. | 1 hour | 33.60 |
| 8 | Clove | 140° C. | 1 hour | 33.40 |
| 9 | Garlic | 140° C. | 1 hour | 25.68 |
| 10 | Chili | 140° C. | 1 hour | 25.29 |
| 11 | White pepper | 140° C. | 1 hour | 15.70 |
| 12 | Ferric pyrophosphate | 140° C. | 1 hour | 33.00 |

For each catalyst used in the present example, the proper content of iron was determined according to standard technique and is as shown in Table II.

The results indicate that heating oil alone at 140° C. for 1 hour already gave obvious roasted aroma in the sample, with a p-AV value of 32.1. It was observed that spices could have either accelerating or suppressing impact on oxidation. Among 10 selected spices, garlic, chili and white pepper had p-AV values slightly lower than the control sample, while the rest of the spices accelerated the oxidation. Oil with cumin had the highest p-AV value among all the samples, which was 50% higher than the control sample.

In comparison, at the same Fe level, the sample with ferric pyrophosphate only experienced a slight increase in p-AV, and no addition fried note was perceived.

It is clear from these results that cumin performs very well as a catalyst, and is the most preferred solution of the present invention.

Example 3

Activation of Corn Oil and Palm Oil with Spices: Results

The same experimental set-up as with sunflower oil in Example 2 was repeated but this time with corn oil and with palm oil.

The results indicated that the experiments with corn oil resulted in basically the same oil activation and p-AV values as was observed in Example 2 for sunflower oil. Similar results were also achieved with using palm oil. However, the use of palm oil needed some higher temperatures and longer holding times as observed with sunflower oil to achieve the same p-AV values. Nevertheless, the overall results and conclusions are the same as was found with sunflower and corn oil. Cumin always performed best in these experiments and was the most efficient catalyst for the oxidation reactions of the different oils.

Example 4

Activation of Chicken Fat with Spices: Method and Results

Oxidation of chicken fat was carried out together with spice catalysts at 140° C. for 4 hour in a temperature controlled reaction vessel. For that, 5 g of powdered spice catalysts was added to 95 g chicken fat and thereafter heated to 140° C. and kept under mild mixing at that temperature for 4 hours. Thereafter, the mixture, i.e. the activated fat composition, was cooled to room temperature. The degree of oxidation of the activated fat was then determined according to the method specific in Example 2. The results are shown in Table IV and FIG. 2.

Figure 2:
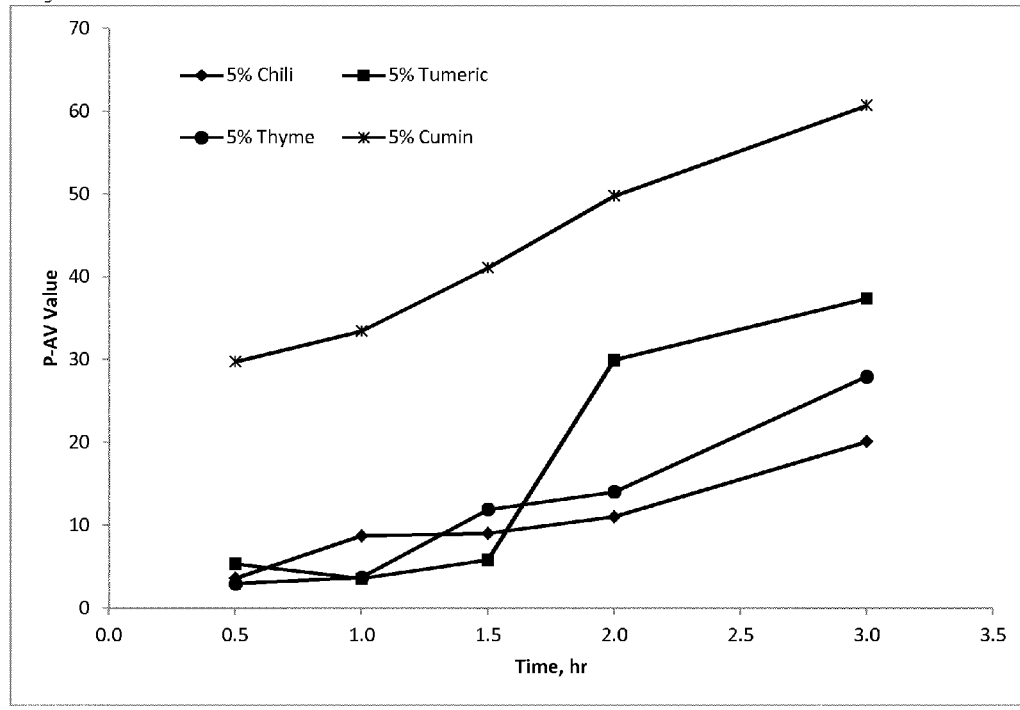
FIG. 2: Plotted p-AV values of activated non-hydrolyzed chicken fat with different catalysts.

The results indicate that heating chicken fat alone at 140° C. for 1 hour gave slight fatty aroma in the sample, with a p-AV value of 2.188. Similar as oils, it was observed that spices could have either accelerating or suppressing impact on the lipid oxidation. E.g. oil with cumin had the highest p-AV compared to chili, turmeric and thyme (see Table III). The same is true for the fat composition, where the results indicated that the experiments with chicken fat resulted in similar fat activation, elevating p-AV values from 1.051 to 29.7 within 30 minutes with added cumin (Table IV). Cumin also performed the best in these experiments and was the most efficient catalyst for the oxidation reactions of the different fats. The results are shown in FIG. 2.

Example 5

Hydrolysis and Activation of Chicken Fat: Methods and Results

Enzymatic hydrolysis of chicken fat was carried out after the addition of 10 wt % water and 0.3 wt % lipase (Lipozyme TL 100L from Novozymes) to the fat, mixing and incubation at 45° C. for 2 hours in a temperature controlled reaction vessel. Spice catalysts were then added to the hydrolyzed chicken fat. The mixture was then thermally treated at 140° C. for up to 3 hours. Thereafter, the mixture, i.e. the activated fat composition was cooled to room temperature.

Figure 3:
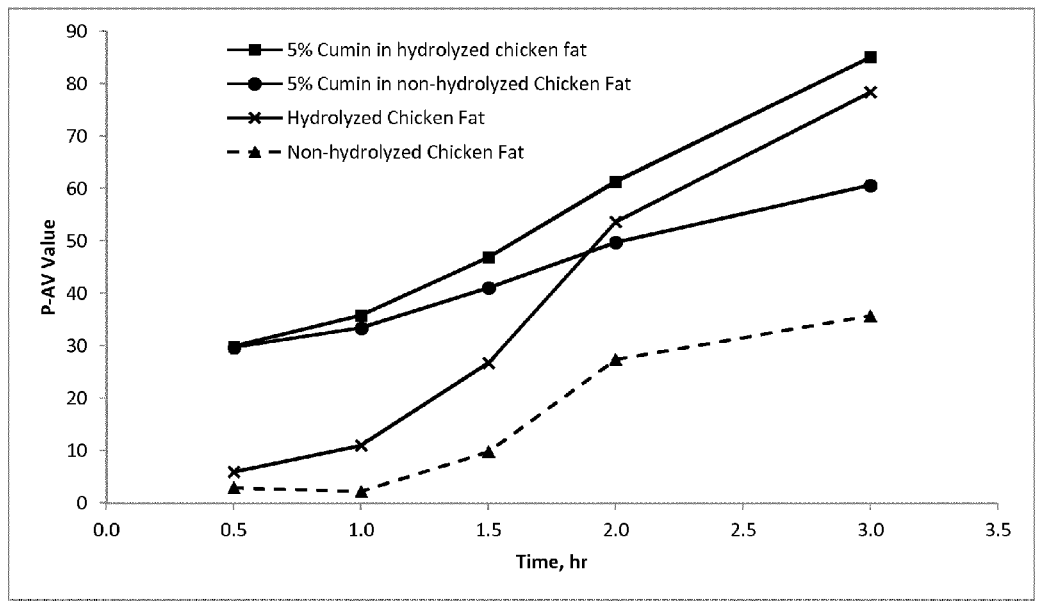
FIG. 3: Plotted p-AV values of hydrolyzed and non-hydrolyzed chicken fat with and without cumin.

The results indicated that the experiments with hydrolyzed chicken fat resulted in higher levels of fat activation due to the presence of free fatty acid. The p-AV values at the end of 3 hours were about doubled compared to the non-hydrolyzed samples. The results are shown in Table IV and FIG. 3.

Example 6

Effect of Cumin as a Catalyst as to Reaction Temperature in the Lipid Oxidation Reaction The effect of the reaction temperature as to the acceleration of the oxidation reaction with and without the presence of cumin was determined. The same experimental process as described in Example 2 was used.

The experiment was repeated in the same way as for sample 1 and 2 in Example 2, with the exception that the temperature of the activation reaction was varied between 80° C. and 160° C. The p-AV value of the different reaction end-products were then determined as described above. The results are shown in FIG. 1.

It can be concluded from those results that the sample without a catalyst only started to generate secondary oxidation products when heat-treated for at least 2.5 hours from about 130° C. temperature upwards. The sample with cumin as a catalyst, however, started to generate such secondary oxidation products when heat-treated under the same conditions already at about 80° C. At 120° C. already a very substantial part of secondary oxidation products is generated, superior as to what the control samples can generate at e.g. 140° C.

TABLE IV

Results of fat activation are as follows:

| Sample | Added Catalyst | Reaction Temperature | Catalyst wt % | Enzyme wt % | p-AV values after indicated Reaction Time in hours | | | | |
|---|---|---|---|---|---|---|---|---|---|
| | | | | | 0.5 h | 1 h | 1.5 h | 2 h | 3 h |
| 1 | -none- | — | — | — | | 1.051 | | | |
| 2 | -none- | 140° C. | — | — | 2.9 | 2.2 | 9.8 | 27.4 | 35.7 |
| 3 | -none- | 140° C. | — | 0.3% | 6.0 | 11.0 | 26.7 | 53.7 | 78.4 |
| 4 | Cumin | 140° C. | 5% | — | 29.7 | 33.4 | 41.1 | 49.8 | 60.7 |
| 5 | Tumeric | 140° C. | 5% | — | 5.3 | 3.6 | 5.8 | 29.9 | 37.4 |
| 6 | Thyme | 140° C. | 5% | — | 2.9 | 3.7 | 11.9 | 14.0 | 27.9 |
| 7 | Chili | 140° C. | 5% | — | 3.6 | 8.7 | 9.0 | 11.0 | 20.1 |
| 8 | Cumin | 140° C. | 5% | 0.3% | 29.9 | 35.8 | 46.9 | 61.3 | 85.1 |

Example 7

Effect of Cumin as a Catalyst as to the Time Requirement for the Lipid Oxidation Reaction The effect of the reaction time period as to the acceleration of the oxidation reaction with and without the presence of cumin was determined. The same experimental process as described in Example 2 was used.

Figure 4:
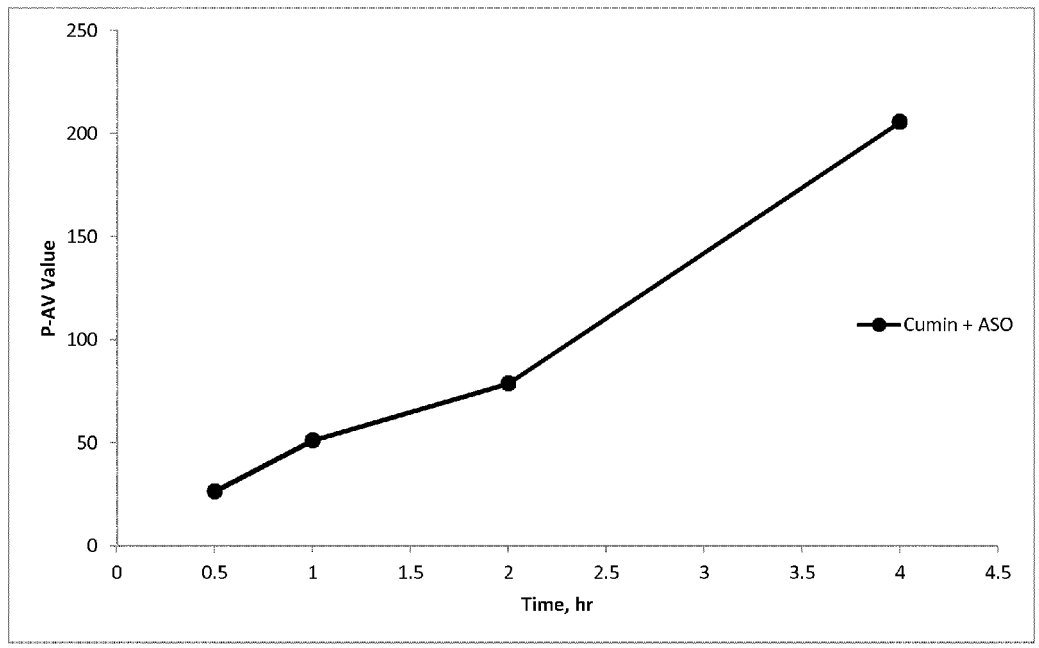
FIG. 4: Plotted p-AV values of activated sunflower oil with cumin for different time periods.

The experiment was repeated in the same way as for sample 1 and 2 in Example 2, with the exception that the reaction time period was varied from 30 minutes to 6 hours. The p-AV value of the different reaction end-products were then determined as described above. The results are shown in FIG. 4.

It can be concluded from those results that the sample with cumin as a catalyst started to generate secondary oxidation products when heat-treated already after about 0.5 hours. After about 2.5 hours, the sample with the presence of cumin already generated substantial amounts of secondary oxidation products.

Example 8

Effect of Dosage of Cumin to the Acceleration of the Oil Oxidation Reaction

The effect of different amounts of cumin added to the oil activation reaction was determined. The same experimental process as described in Example 2 was used.

Figure 5:
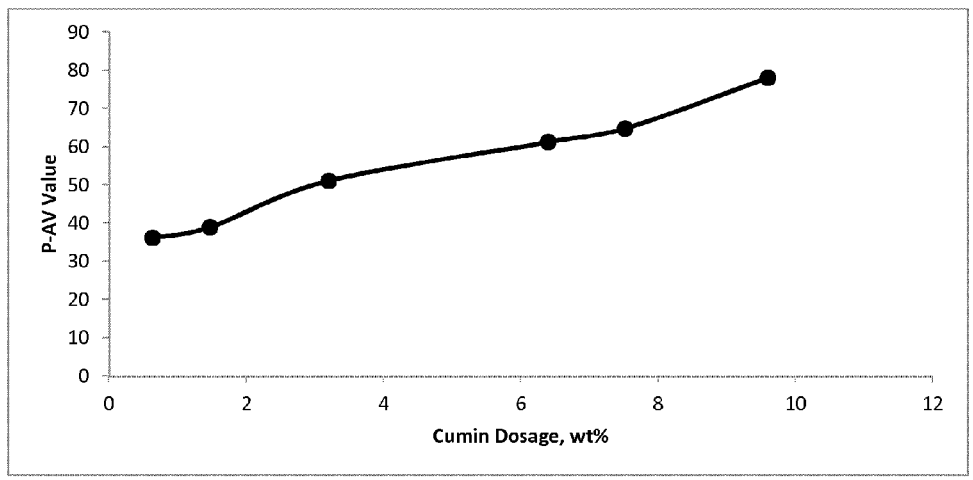
FIG. 5: Plotted p-AV values of activated sunflower oil with different amounts of cumin used during the activation step of the method.

The experiment was repeated in the same way as for sample 2 in Example 1, with the exception that the amount of added cumin was varied between 0.5 and about 10 wt %. The p-AV value of the different reaction end-products were then determined as described above. The results are shown in Table V and FIG. 5.

It can be concluded from those results that the samples with an amount of 0.5 wt % cumin or more are generating secondary oxidation products. It further can be seen that in this specific experimental set-up a saturation of the catalytic effect was not yet reached with the addition of about 10 wt % of added cumin to the reaction mixture. The dosage effect is still quasi linear at these concentrations of cumin. Yet, as of practical considerations such as product costs and flavor impact of the proper cumin taste and flavor to a final product, an optimal amount of cumin was determined to be between ca. 3 wt % and 7 wt % of added cumin.

TABLE V

Dosage effect of cumin as catalyst

| | Cumin, wt % | Equivalent Fe content, ppm | p-AV |
|---|---|---|---|
| 1 | 0.6 | 1.0 | 36.09 |
| 2 | 1.5 | 2.3 | 38.90 |
| 3 | 3.2 | 5.0 | 51.04 |
| 4 | 6.4 | 10.0 | 61.18 |
| 5 | 7.5 | 11.8 | 64.75 |
| 6 | 9.6 | 15.0 | 78.01 |

Example 9

Figure 6:
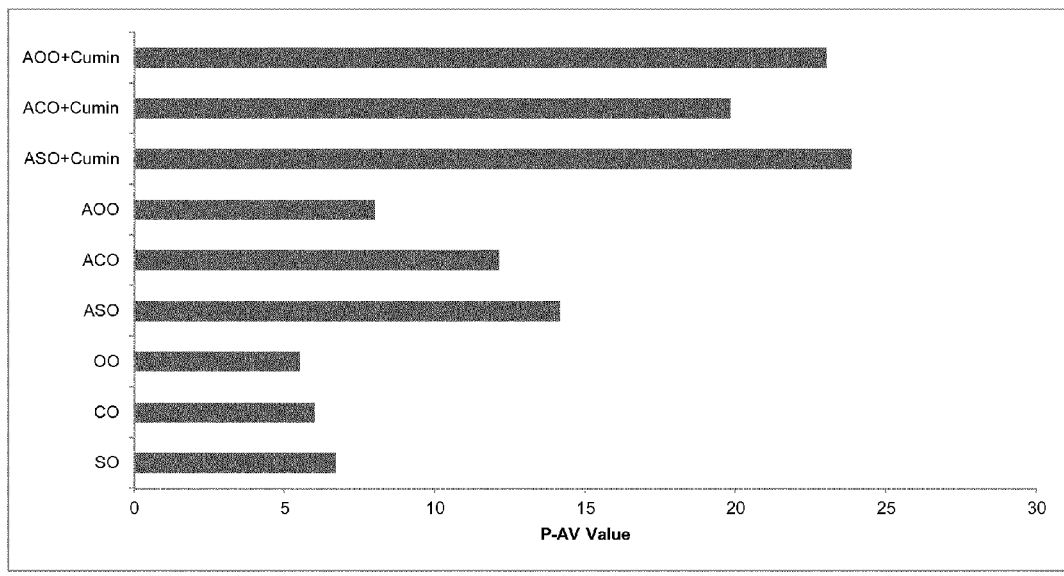
FIG. 6: p-AV values of fresh and activated oils in kitchen trials.

Sensory Profiling of Spice-Assisted Activated Oils Applied in Cooking Aid Emulsions Three types of oils were activated in the kitchen before incorporation in a cooking aid emulsion: sunflower oil (SO), corn oil (CO) and olive oil (OO). The p-anisidine values of fresh (SO, CO and OO) and heat activated oils (ASO, ACO and AOO) were measured and shown in FIG. 6. The activated oils without cumin had higher p-AV values compared to the fresh oils. The p-AV values of the cumin activated oil samples were even higher, i.e. about twice as high as the corresponding active oils without cumin. This indicated that a combination of oils and cumin accelerated the oxidation and generated more fried note at a same heating condition.

The activated oil with cumin was then applied in a cooking aid in the form of an emulsion. The prototype recipe of such a cooking aid is shown in Table VI, where the paste-like product is made of oil, an emulsifier, rice flour, modified starch, salt and water. To test the activated oils, the oil part of the recipe was replaced by non-activated oil, activated oil, and cumin-activated oil. Three types of oils were used including corn oil (CO), olive oil (OO) and sunflower oil (SO), and cumin was selected to assist oil activation. 200 g sunflower oil and corn oil were heated at 140° C. for 40 min, while olive oil was heated at 120° C. for 30 min due to its lower smoke point and stability. 7 wt % of cumin were added in each heating trial. The ingredients per recipe sample were then all mixed together and emulsified into a paste. The P-Anisidine value (p-AV) of the different samples was then determined and is shown in Table VII.

TABLE VI

The formulation of the cooking aids

| | Ingredients | wt % |
|---|---|---|
| 1 | Oil/Activated oil | 35 |
| 2 | Emulsifier | 1.5 |
| 3 | Rice Flour | 7 |
| 4 | Modified starch | 10 |
| 5 | Salt | 6 |
| 6 | Water | 40.5 |

The activated oils were then subsequently used in frying applications for chicken. During cooking, the paste was evenly spread on the chicken and fried on pan at controlled temperature and time. Sensory analysis was done to evaluate the fried notes in chicken fried using the cooking aid in a group of 10 people. The sensory description of each sample was shown in Table VII.

Fried note was identified in samples with activated oils (no. 2-7) and more obvious when cumin was incorporated (no. 5-7). A desirable fried and roasted note was identified easily in the samples no. 5-7. In addition, fresh cumin was added as a control for cumin taste after the activation of the oil in samples no. 8 and 9. In these 2 samples, the cumin spice note became clearly present and more dominant than the fried note. It showed that the panellists were able to clearly distinguish between a cumin aroma and fried note. Hence, this is good evidence that the perceived fried note in the samples 5-7 was not due to the proper aroma of the cumin.

Moreover, a fat reduction trial was done with cumin activated sunflower oil (sample no. 10). 12% less oil was added in the cooking oil emulsion (based on the formulation in Table VI); yet the enhanced fried note was still identified comparing to the control sample no. 1. It shows that the fat activation with cumin can be applied in applications for fat reduction while maintaining the same level of fried flavour.

Hence, by incorporating a cumin-activated oil into a cooking aid paste, the final product has a higher level of fried aroma and taste. With a 12% total reduction of the oil content, the fried note in the final product was still rated high among the tested samples, which indicates the potential of lipid activation to reduce fat and/or oil in food products without compromising on the typically fatty and fried flavor.

TABLE VII

Sensory descriptions and p-AV values of fried chicken with cumin activated oil.

| No. | Sample | Comments | p-AV of oil |
|---|---|---|---|
| 1 | Control—cooking aid with SO | Bland Taste | 6.4 |
| 2 | ASO (heat act., no cumin) | Rancid/fried note, fatty mouthfeel | 14.2 |
| 3 | ACO (heat act., no cumin) | Fried note | 12.1 |
| 4 | AOO (heat act., no cumin) | Unique smoky taste, more fried and pungent note | 4.1 |
| 5 | ASO-Cumin (heat act. with Cumin) | Fried and roasted note identified easily, less salty | 23.8 |
| 6 | AOO-Cumin (heat act. with Cumin) | Fried and roasted note identified easily, | 19.8 |
| 7 | ACO-Cumin (heat act. with Cumin) | Fried and roasted note identified easily | 23.0 |
| 8 | ASO (No. 2) + fresh Cumin | Cumin spice flavor more prominent then fried note | 14.2 |
| 9 | SO (No. 1) + fresh Cumin | Cumin spice flavor more prominent then fried note | 6.4 |
| 10 | ASO-Cumin (No. 5) 12% Reduced Fat content | Fried and roasted note | 23.8 |

The invention claimed is:

1. A method for accelerating oxidation of lipids, the method comprising holding a lipid composition in the presence of cumin for a time period from 30 minutes to 6 hours at a temperature from 80° C. to 180° C.

2. The method according to claim 1, wherein the lipid composition comprises at least 75 wt % of a component selected from the group consisting of fat, oil and combinations thereof.

3. The method according to claim 1, wherein the cumin is present in the lipid composition in an amount of 0.1 to 20 wt %.

4. The method according to claim 1, wherein the temperature ranges from 120° C. to 160° C.

5. The method according to claim 2, wherein the fat is an animal fat.

6. The method according to claim 5, wherein the fat is selected from the group consisting of beef fat, chicken fat, lamb fat and pork fat.

7. The method according to claim 2, wherein the oil is selected from the group consisting of corn oil, olive oil, soybean oil, sunflower oil, peanut oil, walnut oil, palm oil, rattan pepper oil, rapeseed oil, sesame oil, and combinations thereof.

8. The method according to claim 1, comprising a step of hydrolyzing the lipid composition.

9. The method according to claim 8, wherein hydrolyzing the lipid composition is an enzymatic hydrolysis.

10. The method according to claim 1, wherein the cumin is the powdered form of dried seeds from *Cuminum cyminum*.

11. A method for improving the flavor of a food composition, the method comprising adding a lipid composition to the food composition, the lipid composition produced by accelerating oxidation of lipids, the accelerating of the oxidation of lipids comprising holding a lipid composition in the presence of cumin for a time period from 30 minutes to 6 hours at a temperature from 80° C. to 180° C.

12. The method according to claim 11, wherein the food composition comprising the added lipid composition is further processed in a flavor reaction process.

* * * * *